United States Patent [19]

Lee, III et al.

[11] Patent Number: 4,766,924
[45] Date of Patent: Aug. 30, 1988

[54] PRESSURE RELIEF VALVE

[75] Inventors: Leighton Lee, III, Madison; Stephen E. Anderson, Old Saybrook, both of Conn.

[73] Assignee: The Lee Company, Westbrook, Conn.

[21] Appl. No.: 938,816

[22] Filed: Dec. 8, 1986

[51] Int. Cl.⁴ .............................................. F16K 17/04
[52] U.S. Cl. ..................................... 137/536; 137/540; 251/333
[58] Field of Search .................. 137/536, 540; 251/333

[56] References Cited

U.S. PATENT DOCUMENTS

| 156,371 | 10/1874 | Orr | 137/536 X |
|---|---|---|---|
| 2,568,026 | 9/1951 | Pigott | 137/540 X |
| 2,675,021 | 4/1954 | Allin | 137/536 |

FOREIGN PATENT DOCUMENTS

| 105575 | 11/1938 | Australia | 251/333 |
| 65208 | 9/1949 | Netherlands | 137/540 |
| 594384 | 2/1978 | U.S.S.R. | 137/536 |
| 953324 | 8/1982 | U.S.S.R. | 137/536 |

Primary Examiner—Robert G. Nilson
Attorney, Agent, or Firm—Chilton, Alix & Van Kirk

[57] ABSTRACT

A relief valve comprises a stationary valve seat and a poppet member which has a valve surface sealingly engageable with the stationary valve seat. The poppet member has an axially extending wall in the vicinity of the valve surface. When the poppet valve is displaced from the stationary valve seat, the low pressure which is exerted against the poppet valve in the vicinity of the poppet valve surface resulting from fluid flowing between the stationary valve seat and the poppet valve surface is generally substantially exerted in a radial direction against the axial wall to thereby prevent reseating of the poppet member at the initial opening conditions for the relief valve.

5 Claims, 4 Drawing Sheets

PRESSURE RELIEF VALVE

BACKGROUND OF THE INVENTION

This invention relates generally to pressure relief valves. More particularly, the present invention relates to miniaturized relief valves employed for regulating the pressure in hydraulic or pneumatic systems.

Conventional pressure relief valves to which the invention relates typically employ a ball which is biased by a spring into sealing engagement with a conical valve seat. When the force of the fluid exerted against the ball exceeds the force of the spring, the ball is axially displaced from the valve seat to thereby commence opening of the valve. As the fluid upstream of the ball valve accelerates through the valve opening, a region of lower pressure is produced in the vicinity of the valve seat. The region of lower pressure reduces the axial force exerted by the fluid on the ball so that the ball valve tends to reseat. The opening and closing (reseating) forces may result in a phenomenon termed "valve chatter" wherein the ball valve oscillates toward and away from the valve seat in a rapid fashion. Valve chatter may present critical problems for fluid systems wherein the rate of pressure change is relatively small. The resultant lower pressure region in the vicinity of the valve seat actually results in the requirement of additional fluid pressure in excess of the opening pressure for reopening the ball valve. Consequently, there may be significant difference between the opening and closing pressures of such conventional relief valves. The fluid flow through the relief valve may also be significantly diminished for a given system pressure at system pressures which are slightly greater than the opening pressure of the relief valve. The noted low pressure reseating characteristics are also common to relief valves which employ valve elements other than balls or spheroids.

SUMMARY OF THE INVENTION

Briefly stated, the invention in a preferred form is a relief valve having a cooperative stationary valve seat member and moveable poppet member configuration which significantly reduces, if not effectively eliminates, the low pressure induced reseating characteristics at initial opening pressures of the valve. The relief valve comprises a housing having a generally axially extending sleeve-like body. The stationary valve seat is disposed in fixed relationship interiorly of the body. The stationary seat surrounds an axially extending passage. The poppet member is received in the housing and axially displaceable therein. The poppet member forms a poppet valve surface which is sealingly engageable with the stationary valve seat to prevent the flow of fluid through the valve seat and is axially displaceable from the valve seat to permit fluid flow between the poppet valve surface and the valve seat. The poppet member comprises an axially extending wall in the vicinity of the poppet valve surface. A closure spring biases the poppet member in a first axial direction. When the pressure exerted against the poppet member in the opposing axial direction is below a pre-established threshold, the poppet valve surface sealingly engages the stationary valve seat. When the pressure exerted against the poppet member exceeds the threshold pressure, the poppet valve surface is axially displaced from the valve seat. The low pressure to which the poppet valve member is subjected in the vicinity of the poppet valve surface due to accelerating fluid flow between the poppet valve surface and the stationary valve seat is substantially radially distributed against the axially extending wall.

In one form of the invention, the stationary valve seat is defined by a convex-shaped surface having a spherical curvature. The poppet member comprises an end portion having a recessed end axially spaced from the poppet valve surface. The wall is generally cylindrical and at least partially defines the recessed end. The poppet valve surface is a generally annular surface with a curvature complementary with the stationary valve seat. The poppet member has a sleeve-like portion forming an interior passageway and an axially spaced recessed end portion adjacent the poppet valve surface.

In another embodiment of the invention, the stationary valve seat is defined by a concave-shaped surface having a spherical curvature. The poppet member has a cylindrical wall which axially extends from the poppet valve surface. A recessed end is adjacent the poppet valve surface. The housing defines a chamber which opens through the stationary valve seat and the housing forms a generally radially extending fluid passageway communicating with the chamber.

The poppet valve surface and the stationary valve surface engage along a generally annular sealing interface having a pre-established diameter. In preferred form, the end surface of the poppet member is axially spaced from the poppet valve surface distance which is approximately ¼ of the interface diameter. The poppet member may also form a plurality of angularly spaced passages to provide fluid communication with the interior of the sleeve-like portion.

The housing in one embodiment forms a valve chamber partially defined by a conically shaped tapered shoulder of the poppet member. The housing also forms a passage which communicates with the valve chamber and opens generally radially through the housing sleeve.

A principle aim of the present invention is to provide a new and improved pressure relief valve having an efficient construction which does not exhibit the valve reseating characteristics whereby the valve is closed or urged to close by the resulting low pressure region produced by the fluid accelerating past the valve seat and to provide a new and improved relief valve wherein the opening and closing pressures of the valve are substantially identical and constant under a wide range of operating conditions.

DETAILED DESCRIPTION OF THE INVENTION

Figure 1:
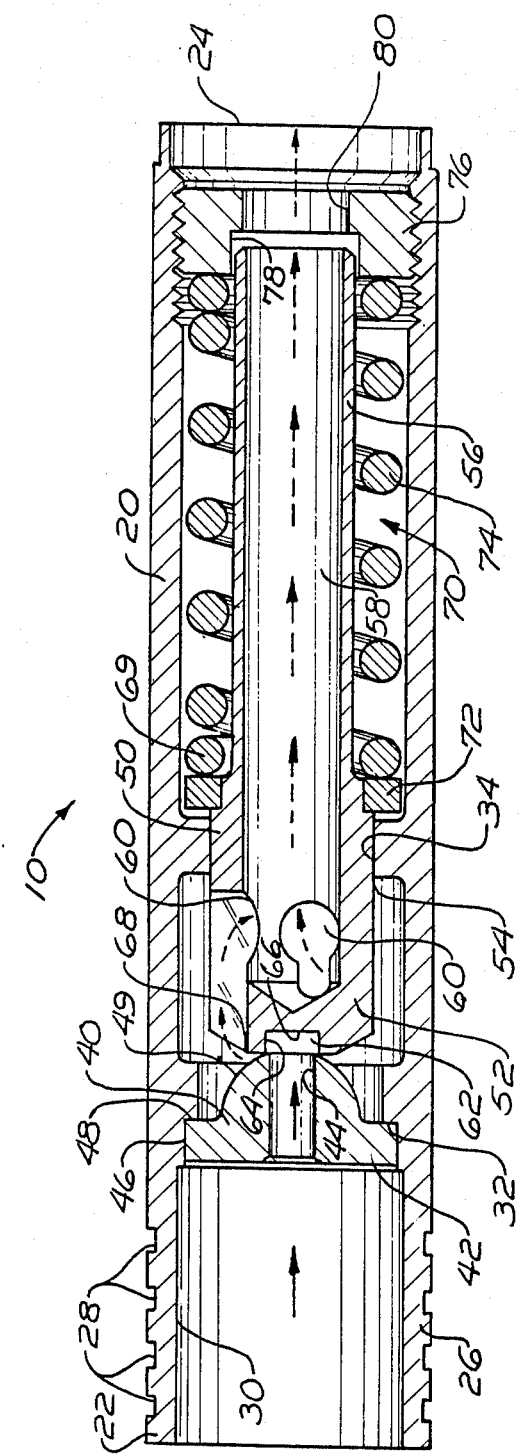
FIG. 1 is an axial sectional view of a pressure relief valve in accordance with the present invention, said valve being illustrated in the closed position.

With reference to the drawings wherein like numerals represent like parts throughout the figures, a pressure relief valve in accordance with the present invention is generally designated in FIG. 1 by the numeral 10. Relief valve 10 is especially adapted to regulate pressure in a fluid system by opening and closing at a preestablished pressure to thereby release excess pressure to a relief outlet. Pressure relief valve 10 is preferably of a compact miniaturized form which is mounted in position in a fluid conduit (not illustrated) of a hydraulic or pneumatic system. The pressure relief valve 10 is inserted into an installation bore (not illustrated) and secured in fixed position. The direction of the relief path from an upstream location to a downstream location through a formed fluid passageway in the relief valve is generally designated by the arrow in FIG. 1. The broken arrow of FIG. 1 illustrates the directional flow path subsequent to the opening of the relief valve 10.

The pressure relief valve 10 comprises a main body or housing in the form of an axially extending sleeve 20 having an upstream end 22 and a downstream end 24. The sleeve 20 interiorly receives the valve assembly and partially defines the relief path through the valve. The housing sleeve 20 is preferably formed from aluminum or a stainless steel material. The upstream end 22 of the sleeve forms an exterior mounting surface 26 and a tapered inlet bore 30. The mounting surface 26 forcefully engages the wall of an installation bore to securely mount the pressure relief valve in position in the fluid system. A plurality of circumferentially extending axially spaced grooves 28 traverse the exterior surface of the sleeve to form alternating axially spaced sealing lands and grooves.

The pressure relief valve is preferably mounted in a fluid conduit by inserting the sleeve into an installation bore. A tapered pin (not illustrated) is inserted into the tapered bore 30 formed at the upstream portion of the sleeve. The pin and the sleeve are dimensioned so that as the tapered pin is forcefully axially driven into the sleeve (to the right of FIG. 1) toward the downstream end 24, the pin forces the sleeve to controllably radially expand to thereby force the sleeve lands to sealingly engage the surrounding wall of the fluid conduit. The edges of the lands bite into the surrounding material of the conduit to form independent seals and retaining rings with the conduit. A passageway through the tapered pin subsequently functions as an inlet fluid passageway when the pressure relief valve is mounted in position.

The valve assembly of the pressure relief valve 10 generally comprises a stationary valve seat 40, a poppet valve 50 and a closure spring assembly 70. The stationary valve seat, poppet valve and the closure spring assembly are generally mounted interiorly of the sleeve 20. The closure spring assembly 70 functions to bias the poppet valve into sealing engagement against the stationary valve seat 40 as illustrated in FIG. 1. When the force produced by the system pressure communicated to inlet bore 30 and exerted against the poppet valve 50 exceeds the spring force of the closure spring assembly 70, the poppet valve axially lifts (to the right in FIG. 1) from the stationary valve seat 40 to thereby open the valve.

The stationary valve seat is formed from a plug 42 which has a central axial bore 44 and is generally symmetrical about a central axis through the bore 44. The plug 42 forms a circumferential cylindrical surface 46 terminating in a forward transverse shoulder 48. The plug is closely received and sealingly engaged interiorly of the sleeve at an upstream location thereof. The radially extending shoulder 48 perpendicular to the cylindrical surface 46 abuts against a locator shoulder 32 at the sleeve interior. The plug is welded to the sleeve 20 to secure the plug in fixed relationship with the sleeve. The axially forward surface portion 49 of the plug has a convex shape with a spherical curvature which symmetrically surrounds the central axial bore 44 and converges toward the downstream opening of the bore. The spherical convex surface 49 functions as the stationary valve seat sealing surface for the valve.

The poppet valve 50 is an elongated sleeve-like member having a closed upstream end forming a valve head 52. The poppet valve is generally axially symmetrical. The poppet valve has an upstream portion of enlarged diameter which forms a guide surface 54. The guide surface 54 is slidably received by a guide bore 34 that integrally protrudes from the housing sleeve 20. A sleeve 56 of reduced diameter axially integrally extends from an intermediate location to the open downstream end of the poppet valve 50. An axial bore 58 through the poppet valve connects with three angularly spaced radial openings 60 proximate the valve head 52 and communicates through the open downstream end of the poppet valve.

The valve head 52 forms a recess 62 which is defined by an axial cylindrical wall 64 and a generally transversely extending end wall 66. The upstream end surface of the valve head adjacent cylindrical wall has an annular concave valve surface 68 with a spherical curvature which is complementary with and sealingly engageable with spherical surface 49 of the stationary seat to form a quasi-annular sealing interface having a relatively small diametral thickness and a spherical curvature. Valve surface 68 may be formed by forcing a ball against the end of the poppet valve to thereby form the valve surface contour.

The inside diameter of the annulus defined by the poppet valve surface 68 and the diameter of the cylindrical wall 64 is greater than the diameter of the bore 44 which opens through the stationary valve seat. It will be appreciated that the annular sealing interface between the stationary seat and the poppet valve is coaxial with the central axis of the sleeve 20 and the bore 44. The end wall 62 is preferably axially displaced from the poppet valve sealing surface 68 a distance which is approximately one-fourth of the inside diameter of the annular sealing interface defined by the engagement of stationary seat surface 49 and poppet valve surface 68.

The poppet valve has an intermediate transverse shoulder 69 which axially seats a retainer washer 72. The retainer washer 72 seats one end of a helical closure spring 74. The closure spring 74 functions to bias the poppet valve 50 into the sealing engagement with the stationary valve seat 40. A retainer lug 76 is threadably received at the downstream end of sleeve 20. The forward surface of the retainer lug 76 seats the downstream end of the closure spring 74. The retainer lug forms a cylindrical recess 78 which slidably receives the downstream end of sleeve 56 to provide a centering and guide structure for the poppet valve. The retainer lug 76 also has a central axial opening 80 which forms a central axial passage. Opening 80 axially aligns with bore 58 so that a relief path through the valve 10 in the general direction of the broken arrows traverses openings 60, bore 58 and opening 80 for communication through the downstream end 24 of the sleeve 20.

Figure 2:
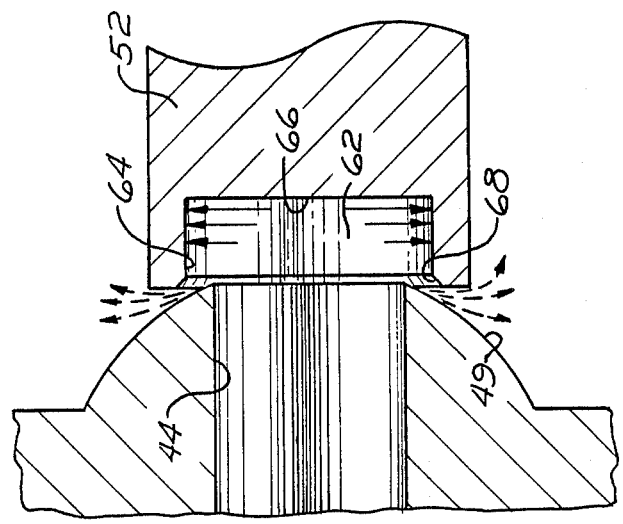
FIG. 2 is an enlarged fragmentary sectional view illustrating the pressure flow characteristics for the valve of FIG. 1 in an opened position.

The cooperative stationary valve seat and poppet valve configurations provide a relief valve which does not tend to reclose nor exhibit valve chattering characteristics at the initial opening pressures of the valve. With additional reference to FIG. 2, when the differential axial force exerted by the fluid pressure in bore 44 and recess 62 exceeds the opposing force of the closure spring 74, the poppet valve is axially displaced (to the right) from the sealing engagement between the poppet valve seat and the stationary valve seat. The pressurized fluid rapidly accelerates through the valve opening defined between the stationary valve seat 40 and the poppet valve 50 as schematically illustrated by the broken arrows in FIG. 2. The acceleration of fluid between the stationary valve seat and the poppet valve produces a low pressure region in the vicinity of the poppet valve head 52 and in particular the sealing surface 68. Because of the valve head configuration, the resulting low pressure or lift exerts essentially no effective axial component which would tend to reseat or reclose the poppet valve. Instead, the low pressure to which the poppet valve is subjected is distributed in a radial fashion (illustrated schematically by the parallel heavy arrows of FIG. 2) against the interior wall 64 of the poppet valve. The poppet valve is configured to present no or insubstantial structure to the resultant low pressure which could be subject to an axially acting low pressure (reseating) component. The end surface 66 is sufficiently spaced from the seal surface 68 and low pressure region to be essentially unaffected by local axial low pressure components. Because there is essentially no axial component which is exerted in the vicinity of the sealing interface of the poppet valve, i.e., the effective zone of the low pressure region, the poppet valve essentially freely lifts from the valve seat 40 at the opening pressure and is unaffected by the low pressure which would tend to force the valve 50 to reseat against the valve seat 40. Consequently, no valve chattering characteristics are exhibited by the pressure relief valve 10.

It should be appreciated that the foregoing pressure relief valve 10 is a relatively compact valve which in one preferred embodiment has an axial length on the order of 2.346 inches and a maximum diameter in the order of 0.50 inches.

Figure 3:
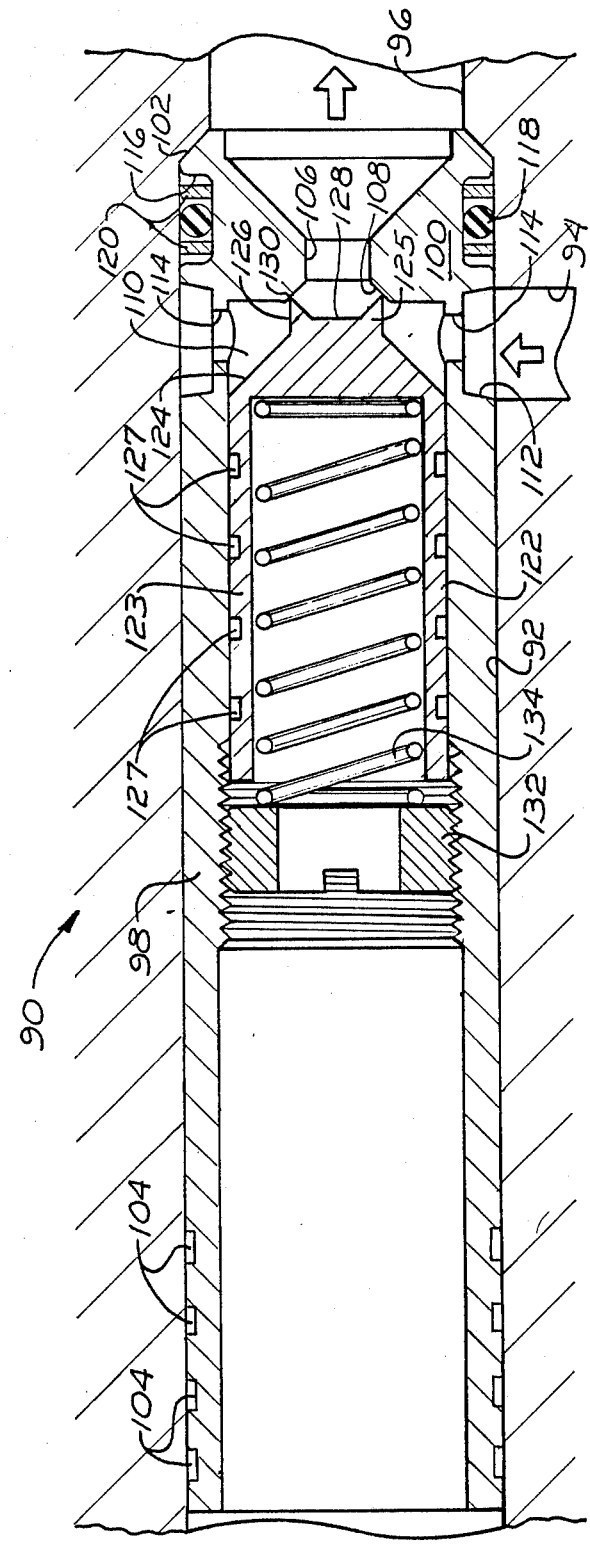
FIG. 3 is an axial sectional view of a second embodiment of a pressure relief valve mounted in a fluid system, said valve being illustrated in the closed position.

With reference to FIG. 3, a second embodiment of a pressure relief valve in accordance with the present invention is generally designated by the numeral 90. Pressure relief valve 90 is mounted in an installation bore 92 of a fluid system. The relief valve 90 is interposed in a fluid relief path which extends in the direction of the arrows from a transverse fluid passageway 94 through the valve for exiting into a general axially extended fluid passageway 96. A sleeve-like housing 98 has a forward downstream head portion 100 which forms a forward tapered shoulder 102. The shoulder 102 which engages a complementary circumferential shoulder of the installation bore 92. The rear portion of the housing is traversed by axially spaced circumferential grooves 104 which form alternating lands. The lands sealingly engage the surrounding wall of the installation bore to secure the relief valve 90 in position as previously described for relief valve 10.

A bore 106 having an inner portion of uniform diameter extends through a central portion of the head 100 and tapers outwardly for axial communication with fluid passageway 96. A stationary valve seat 108 defined by a concave generally annular surface encircles the inner end portion of bore 106. The stationary valve seat 108 preferably has a concavity which is defined by a spherical curvature.

Bore 106 selectively communicates with a valve chamber 110 formed interiorly of the housing 98. An inlet annulus 112 circumferentially traverses the exterior of the housing. Diametral inlet bores 114 fluidly connect between the annulus 112 and the valve chamber 110. The annulus 112 generally aligns with the transverse passage 94 to define a fluid flow path via annulus 112, inlet bores 114, and valve chamber 110 for selective fluid communication via bore 106 with the axial passage 96 of the fluid system.

A circumferentially extending groove 116 is formed between the forward shoulder 102 and the annulus 112 at the housing exterior. The groove 116 retainably mounts an O-ring 118 and a pair of back-up rings 120 positioned at each axial side of the O-ring for sealing the relief valve 90 in fluid type relationship with the installation bore 92.

A poppet valve 122 is closely interiorly received by the housing 98 and is axially displaceable therein. The poppet valve has a cylindrical sleeve portion 123 which is circumferentially traversed by grooves 127 to fluidly seal the valve chamber 110. Poppet 122 includes a forward conical surface 124 and an axially protruding poppet valve head 125 which partially defines valve chamber 110. The valve head 125 is defined by an axially extending cylindrical wall 126 and a tapered recess 128 at the forward end of the poppet. The wall 126 and wall defining portions of recess 128 intersect at a well defined quasi-annular valve surface 130 which is complementary with the stationary valve seat 108 and sealingly engageable therewith to seal the fluid flow between valve chamber 110 and bore 106 and therefore between passageway 94 and passageway 96.

A lug 132 is interiorly threaded to the housing to form an axially positionable spring seat. A closure spring 134 is interiorly captured by the sleeve portion of the poppet valve 122 and is seated against a transverse shoulder of the lug 132. The closure spring 134 urges the poppet valve at surface 130 into the sealing engagement with the stationary valve seat 108 as illustrated in FIG. 3.

Figure 4:
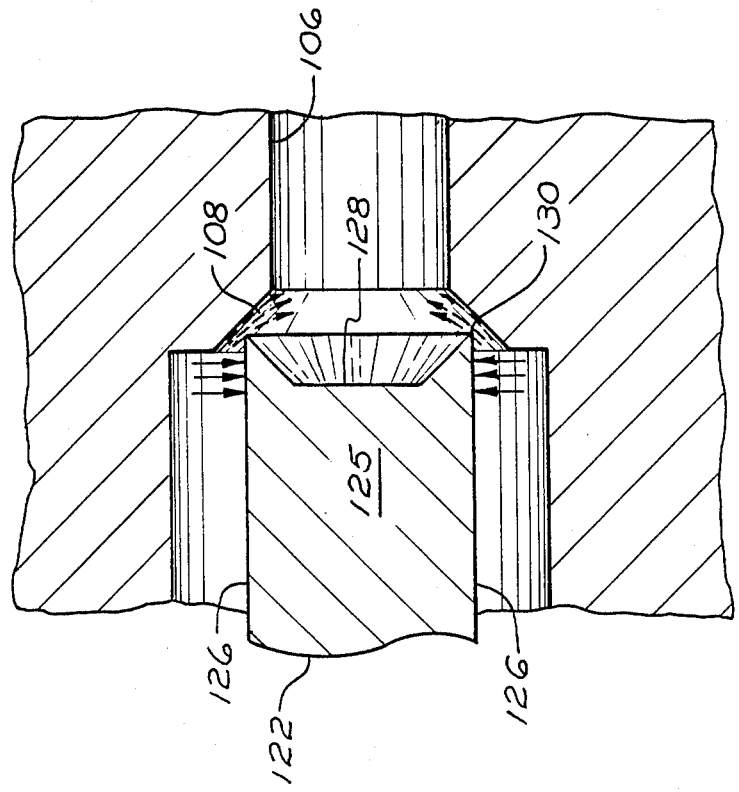
FIG. 4 is an enlarged fragmentary sectional view illustrating the pressure flow characteristics for the valve of FIG. 3 in an opened position.

When the axial force produced by the differential fluid pressure across the conical face 124 of the poppet valve exceeds the opposing axial forces exerted by the closure spring 134, the poppet valve 122 is axially displaced from the stationary valve seat 108 (to the left in FIG. 3) thereby allowing fluid communication through the relief valve in the direction of the arrows via bore 106 to axial passage 96. As the pressurized fluid accelerates through the initially formed opening between the poppet valve surface 130 and the stationary valve seat 108 as schematically illustrated by broken arrows in FIG. 4, a low pressure region is formed in the vicinity of the valve seat. The resultant lift or low pressure to which the poppet valve is subjected in the vicinity of the poppet valve surface is confined to a generally radial component against axial cylindrical wall 126 as schematically illustrated by the parallel solid arrows in FIG. 4. Because only an axially oriented poppet valve structure is initially presented to the resultant low pressure which is applied to the poppet member and no axial low pressure components effectively act on the poppet valve, there is essentially no valve chatter nor tendency of the poppet valve 122 to reseat due to the released fluid accelerating past the valve seat. Thus, the pressure relief valve 90 has a substantially constant opening pressure as well as a closing pressure which is nearly equal to the opening pressure of the valve.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A relief valve comprising:

housing means for forming a generally axially extending body defining a cavity;

stationary seat means disposed in fixed relationship with said body, said seat means forming an axially extending passage and a stationary valve seat surrounding said passage, said stationary valve seat comprising a convex-shaped surface having a generally spherical curvature;

poppet means received in said cavity and axially displaceable therein, said poppet means having a poppet valve surface sealingly engageable with said stationary valve seat to prevent the flow of fluid through said valve seat and axially displaceable from said valve seat to permit fluid flow between said poppet valve surface and said valve seat, said poppet means comprising a poppet member having a generally sleeve-like portion and a plurality of angularly spaced passages to provide fluid communication with the interior of said sleeve-like portion and having an end portion having a recessed end axially spaced from said poppet valve surface and an axially extending, generally cylindrical inner wall in the vicinity of said poppet valve surface, said wall at least partially defining said recessed end; and closure spring means for biasing said poppet means in a first axial direction so that when the pressure exerted against the poppet means in the opposing axial direction is below a preestablished threshold, said poppet valve surface sealingly engages said stationary valve seat, and when pressure exerted against the poppet means exceeds the threshold pressure, said poppet valve surface is axially displaced from said valve seat and the low pressure to which said poppet valve means is subjected in the vicinity of said poppet valve surface resulting from accelerating fluid flow between said poppet valve surface and said stationary valve seat is substantially radially distributed against said axially extending wall.

2. The relief valve of claim 1 wherein the poppet valve surface is a generally annular surface with a curvature complementary with said stationary valve seat.

3. The relief valve of claim 1 wherein the poppet valve surface and the stationary valve seat engage along a generally annular sealing interface having a pre-established inside diameter and the end surface is axially spaced from the poppet valve surface a distance which is approximately one-fourth of the interface diameter.

4. A relief valve comprising:

housing means for forming a generally axially extending body defining a cavity;

valve seat means mounted in fixed relationship to said body, said seat means forming an axially extending passage and a stationary valve seat symmetrically surrounding said passage, said stationary valve seat having the general shape of a convex spherical section;

poppet means received in said cavity and axially displaceable therein, said poppet means comprising a poppet member having a generally sleeve-like portion and a plurality of angularly spaced passages to provide fluid communication with the interior of said sleeve-like portion and having a poppet valve surface sealingly engageable with said stationary valve seat to prevent the flow of fluid between said surface and valve seat and displaceable from said stationary valve seat to permit fluid flow therethrough, said poppet means having a recessed end portion adjacent said poppet valve surface, said recessed end portion being at least partially defined by an axially extending, generally cylindrical wall and an end surface displaced from said poppet valve surface; and closure spring means for biasing said poppet means so that when the pressure in the passage is below a pre-established threshold pressure, said poppet valve surface sealingly engages said stationary seat means and when the pressure in said passage exceeds said threshold pressure, said poppet valve surface is axially displaced from said stationary valve seat and the low pressure exerted against said poppet means in the vicinity of said poppet valve surface resulting from fluid flowing between said stationary valve seat and said poppet valve surface is generally substantially exerted in a radial direction against said axial wall of the recessed portion.

5. The relief valve of claim 4 wherein the poppet valve surface and the stationary valve seat engage along a generally annular sealing interface having a pre-established inside diameter and the end surface is axially spaced from the poppet valve surface a distance which is approximately one-fourth of the interface diameter.

* * * * *